E. G. BORMANN.
SWINGLETREE.
APPLICATION FILED APR. 7, 1910.
982,788.
Patented Jan. 31, 1911.
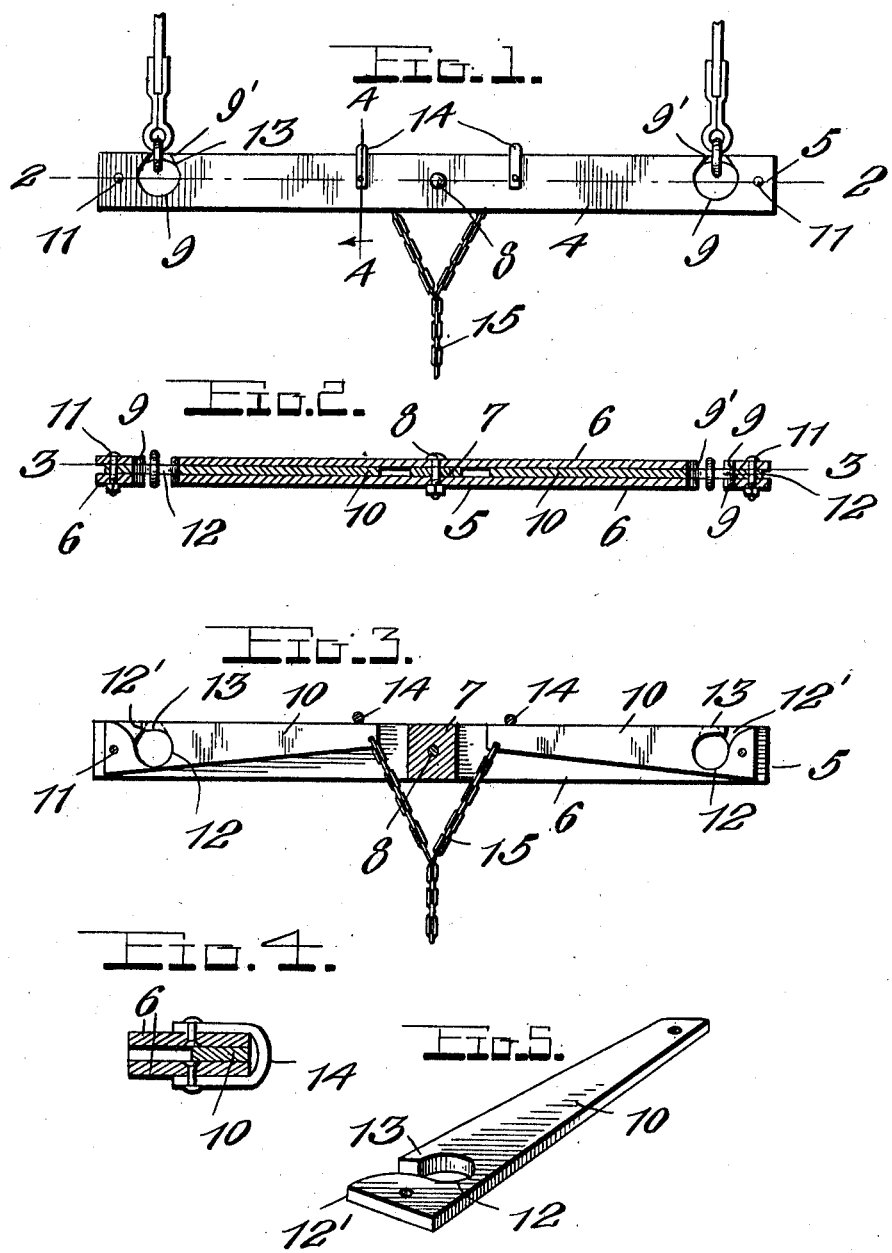

UNITED STATES PATENT OFFICE.

EARNEST G. BORMANN, OF CORSICA, SOUTH DAKOTA.

SWINGLETREE.

982,788.  Specification of Letters Patent.  Patented Jan. 31, 1911.

Application filed April 7, 1910. Serial No. 553,915.

*To all whom it may concern:*

Be it known that I, EARNEST G. BORMANN, a citizen of the United States, residing at Corsica, in the county of Douglas and State of South Dakota, have invented certain new and useful Improvements in Swingletrees, of which the following is a specification, reference being had to the accompanying drawings.

This invention relates to horse detachers and has for its object to provide a simple and inexpensive device of this character whereby the traces may be very quickly released from the ends of the swingletree to detach the horse from the vehicle when the animal becomes frightened.

Another object is to provide a device of the above character which is so constructed that the traces are normally locked to the ends of the swingletree and held thereon against all possibility of accidental release.

With these and other objects in view, the invention consists of the novel features of construction, combination and arrangement of parts hereinafter fully described and claimed, and illustrated in the accompanying drawings, in which—

Figure 1 is a top plan view of a swingletree illustrating one embodiment of my invention; Fig. 2 is a section taken on the line 2—2 of Fig. 1; Fig. 3 is a section taken on the line 3—3 of Fig. 2; Fig. 4 is a section taken on the line 4—4 of Fig. 1; and Fig. 5 is a detail perspective view of one of the trace locking bars.

Referring more particularly to the drawings 5 indicates the swingletree which comprises two similar metallic plates or bars 6. These plates are held in spaced parallel relation by means of a block 7 centrally arranged therebetween, a bolt 8 passing through the swingletree plates and the block to rigidly secure the same together. The ends of each plate are formed with openings 9, said openings extending inwardly from one of the longitudinal edges of the bar or plate, the entrance thereof being contracted as shown at 9' for a purpose which will later appear.

Between the swingletree plates 6 the trace locking members 10 are disposed. These locking members as clearly shown in Fig. 3 have one of their edges acutely inclined with relation to the other so that they gradually decrease in width from end to end. The wider end of each of these members is positioned between the extremities of the plates 6, said members extending inwardly to a point adjacent to the center of the swingletree. The locking members 10 are eccentrically pivoted at their wider ends between the plates 6, the pivot pins or bolts 11 extending through said members at a point adjacent to their inner inclined edges. Each of the members 10 is also provided in its wider end with an opening 12, of substantially the same diameter as the openings 9 in the plates 6. These openings 9 and 12 are adapted to register, and the contracted entrance neck 12' which extends inwardly from the outer edge of the members 10 is normally disposed out of the plane of the entrance 9' to the openings 9 in the swingletree plates 6. Thus a narrow neck 13 is provided on the end of each of the locking members 10 which closes the openings 9 of the plates 6. The ring or cockeye in the end of the trace tug is adapted to be inserted over this neck 13, the members 10 being moved inwardly between the plates 6 so that the entrances 9' and 12' are alined. After the ends of the traces have been positioned in these openings and the locking members 10 returned to their normal position, the traces will be securely locked to the ends of the swingletree. The accidental rearward movement of the members 10 is obviated by the eccentric mounting of said members between the swingletree plates 6, the draft of the animal tending to draw said members outwardly, the traces engaging said members forwardly of the pivot pins 11. In order to prevent the outward movement of the members 10, the U-shaped retaining members 14 are provided. The outer longitudinal edges of the locking members 10 engage with the retaining members 14 whereby further movement of said members is prevented.

To the inner ends of the locking members 10, the ends of a releasing chain 15 are secured. This chain extends up to the driver's seat and is held in any suitable manner in such position that it may be readily grasped and pulled. When the chain is pulled it will be seen that the locking members 10 will be drawn rearwardly between the swingletree plates, and the entrance 12' of the openings 12 in the ends thereof, alined with the entrances 9' of the openings 9. This movement of the members 10 forces the ends of the traces off of the necks 13 formed on said members, the traces dropping to the ground. The animal is thus released from the vehicle and all danger of wrecking the same by the efforts of the animal to release himself are obviated.

From the foregoing it is believed that the construction and operation of my improved horse detacher will be readily understood without necessitating any further description.

The device is simple, very durable in construction and may be manufactured at a very low cost.

The pivotal mounting of the locking members between the swingletree plates and the engagement of the traces with said members effectually prevents any possibility of the accidental release of the traces, while at the same time the traces may be instantly released when desired and liability of injury to the vehicle or its occupants obviated.

While I have shown and described the preferred embodiment of my invention, it will be understood that the same is susceptible of many minor modifications without materially departing from the essential features or sacrificing any of the advantages thereof.

I claim—

1. In combination, a swingletree comprising spaced parallel plates centrally secured together, said plates having alined openings formed in their ends extending inwardly from their outer longitudinal edges, locking members pivoted between the ends of said plates and provided with openings therein adapted to register with the openings in the plates, the openings in said locking members having contracted entrances forming necks, said necks being adapted to engage with traces to secure the same in said openings, means for preventing outward movement of said members, and means for moving said members between said plates to disengage the traces from said necks and release the same.

2. In combination, a swingletree comprising spaced parallel plates having alined openings formed in their ends, locking members gradually increasing in width from end to end, said members being pivoted at their wider ends between the ends of said plates, said members each having an opening adapted to register with the openings in said plates, extensions formed on said members disposed in said openings to engage with and retain the traces therein, retaining members secured to said plates and adapted to be engaged by the inner ends of said locking members to prevent their outward movement, and an operating element secured to the inner ends of said locking members to move the same between said plates and disengage the traces therefrom to release the same.

In testimony whereof I hereunto affix my signature in the presence of two witnesses.

EARNEST G. BORMANN.

Witnesses:
 MATT HARRIS,
 H. L. NIXON.